United States Patent
Alfonso et al.

(10) Patent No.: US 6,836,405 B2
(45) Date of Patent: Dec. 28, 2004

(54) COMPUTER CHASSIS INTEGRATED MOUNTING AND SECURITY SYSTEM

(75) Inventors: Pedro M. Alfonso, Austin, TX (US); Daniel S. Carr, Round Rock, TX (US); Robert Duane Hrehor, Jr., Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 174 days.

(21) Appl. No.: 10/339,427

(22) Filed: Jan. 9, 2003

(65) Prior Publication Data

US 2004/0136157 A1 Jul. 15, 2004

(51) Int. Cl.[7] .................................................. G06F 1/16
(52) U.S. Cl. ......................... 361/683; 70/58; 292/165; 312/223.2; 49/394
(58) Field of Search ............................... 361/679–686; 312/223.1, 214, 223.2, 215, 140.4, 222, 351.7; 248/678, 188.8, 676, 147; 70/57, 58, 67–69; 49/294, 324, 380, 381

(56) References Cited

U.S. PATENT DOCUMENTS

| | | | | |
|---|---|---|---|---|
| 4,696,449 A | * | 9/1987 | Woo et al. ................... 248/553 |
| 4,786,121 A | * | 11/1988 | Lyons ...................... 248/316.7 |
| 4,949,934 A | * | 8/1990 | Krenz et al. ................. 361/687 |
| 5,154,456 A | * | 10/1992 | Moore et al. ................ 292/162 |
| 5,228,658 A | * | 7/1993 | Kelley ............................ 70/58 |
| 5,417,012 A | * | 5/1995 | Brightman et al. ............ 49/382 |
| 5,462,350 A | * | 10/1995 | Brightman et al. ....... 312/351.7 |
| 5,568,359 A | * | 10/1996 | Cavello et al. .............. 361/686 |
| 5,622,064 A | | 4/1997 | Gluskoter et al. |
| 5,660,451 A | * | 8/1997 | Glynn ...................... 312/223.2 |
| 6,038,892 A | | 3/2000 | Schmitt |
| 6,061,234 A | | 5/2000 | Broder et al. |
| 6,166,910 A | * | 12/2000 | Ronberg et al. ............. 361/724 |
| 6,178,089 B1 | | 1/2001 | Alfonso et al. |
| 6,570,756 B2 | * | 5/2003 | Alfonso et al. ............. 361/683 |

* cited by examiner

*Primary Examiner*—Lisa Lea-Edmonds
(74) *Attorney, Agent, or Firm*—Haynes and Boone, LLP

(57) ABSTRACT

An information handling system such as a computer can be mounted in a secure and accessible manner. A bracket is attached to a support surface. A mounting member is releasably attached to a computer chassis in one of a plurality of orientations. The mounting member and computer chassis are movably mounted on the bracket. A security cover is attached onto the computer chassis for restricting movement of the mounting member on the bracket. The security cover is locked onto the computer chassis.

23 Claims, 6 Drawing Sheets

US 6,836,405 B2

COMPUTER CHASSIS INTEGRATED MOUNTING AND SECURITY SYSTEM

BACKGROUND

The present disclosure relates generally to information handling systems, and more particularly to a computer chassis integrated mounting and security system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Security of computers and computer systems is important not only with regard to electronic access but also with regard to physical access. Computer theft is quite common.

Most desktop computer chassis may be positioned in numerous orientations, including desk-mounted, floor-mounted and suspended. With the advent of ultra-small form factor (USFF) computers, new mounting approaches can be used.

The combination of mounting the computer and securing the computer in the mounted position may be integrated to provide convenience, access and security.

Therefore, what is needed is an apparatus for integrating a system whereby a computer is operably mounted in a secured manner.

SUMMARY

One embodiment, accordingly, provides a computer including a support surface bracket. A mounting member is movably mounted on the bracket. A computer chassis is releasably mounted on the mounting member. A security cover member is attached to an end of the chassis. The cover member is locked into engagement with the chassis whereby movement of the mounting member on the bracket is restricted.

A principal advantage of this embodiment is that the computer chassis is secured in a selected mounting position which integrates convenience, access and security. A significant enhancement to security from theft is provided by the cover member being locked onto the chassis.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
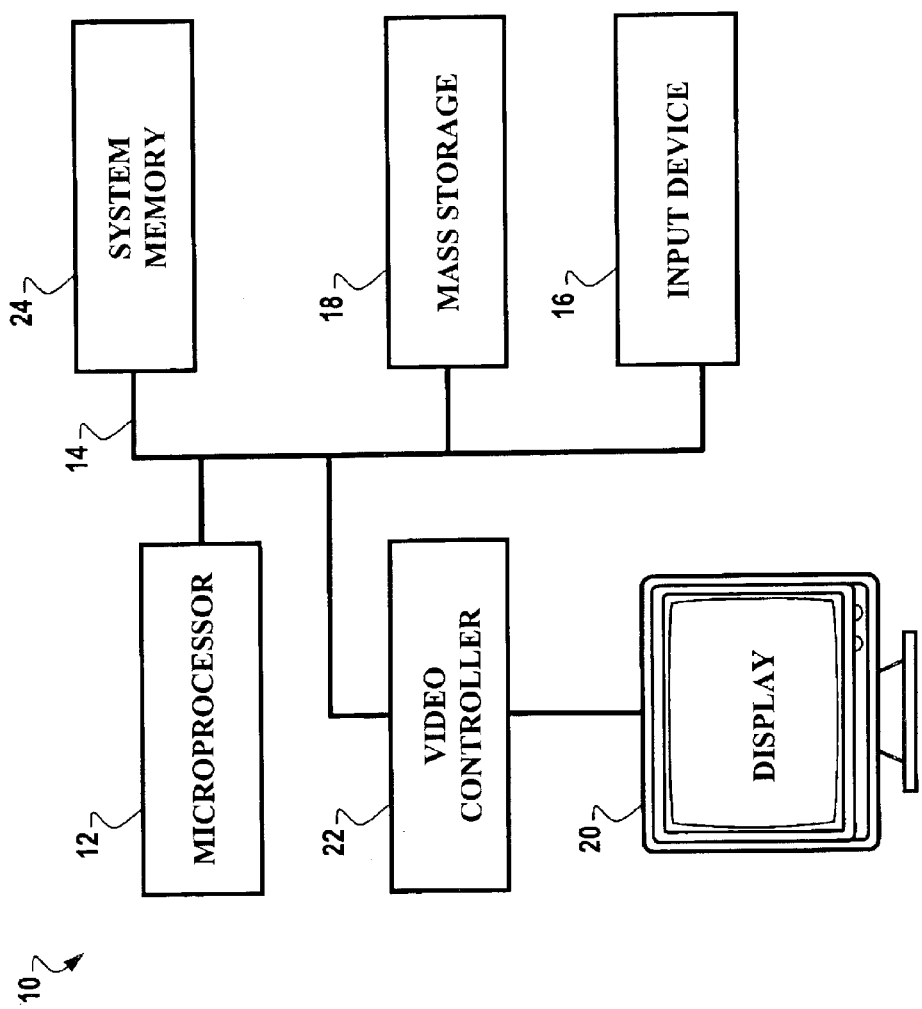
FIG. 1 is a diagrammatic view illustrating an embodiment of a computer system.

In one embodiment, information handling system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
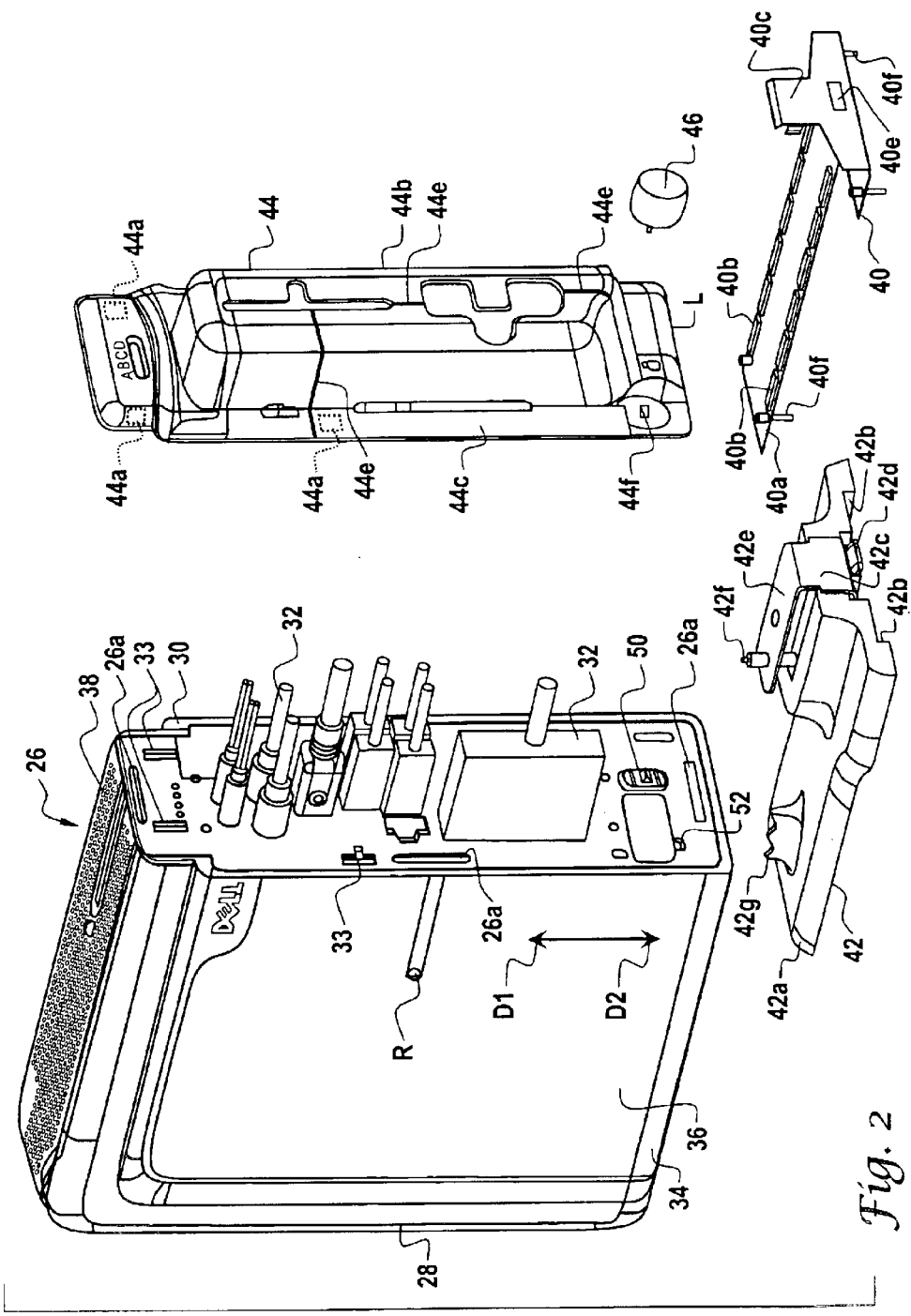
FIG. 2 is an exploded view illustrating an embodiment of a chassis security system.

An ultra-small form factor (USFF) computer chassis 26, FIG. 2, may contain all or most of the components of system 10 as described above. Chassis 26 includes a first end 28, a second end 30 having various cable connections 32 thereon, a first side 34 having a removable panel 36, and a second side 38, discussed later. Chassis 26 may be mounted and secured by means of a support surface bracket 40, a mounting member 42, and a security cover 44 which may be locked onto chassis 26 by a well-known Kensington lock 46, or other suitable lock.

Bracket 40 includes an elongated body 40a having a plurality of opposed tabs 40b. An end of body 40a includes a flange 40c and a slot 40e. Bracket 40 is attachable to a support surface, such as a desk or the like, by a plurality of fasteners 40f extending from body 40a.

Mounting member 42 includes an elongated body 42a and a pair of opposed guides 42b which extend along the length of body 42a for receiving tabs 40b of bracket 40. An end 42c of body 42a includes a flexible quick-release snap-tab 42d extending therefrom and also includes an elongated key 42e. Also, a fastener 42f extends through body 42a. A foot 42g also extends from body 42a.

Figure 3:
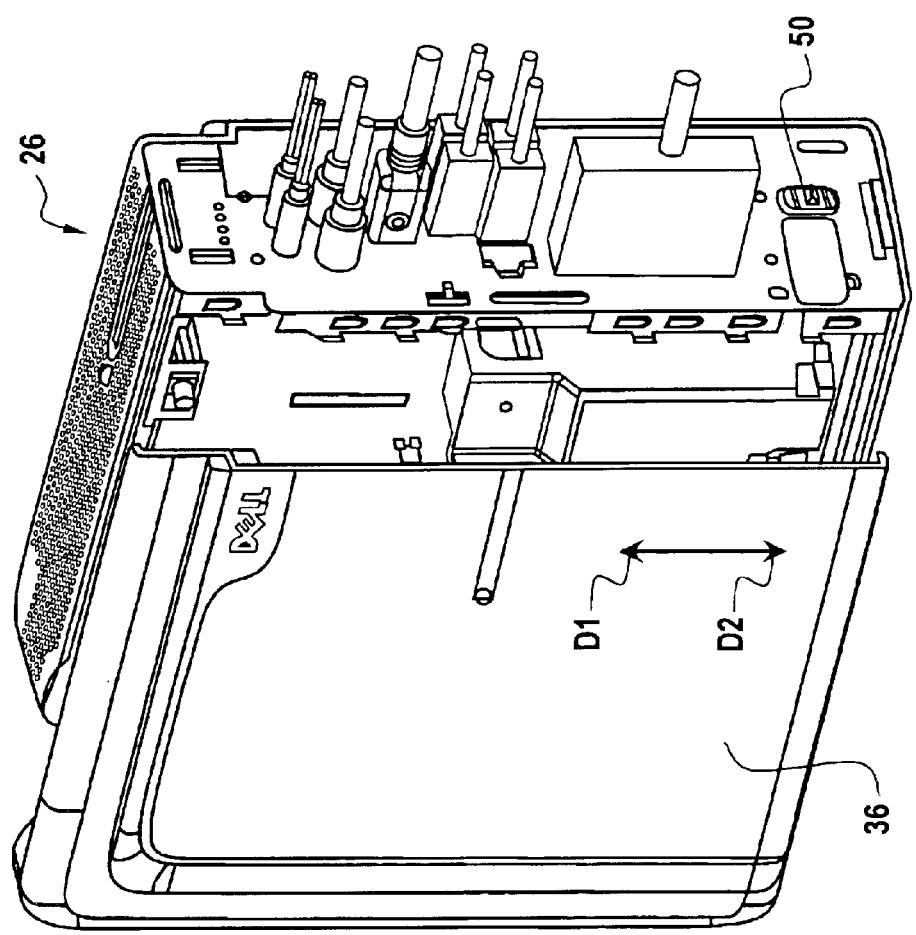
FIGS. 3, 4 and 5 are associated views of embodiments of the chassis.

Chassis 26 also includes a plurality of mounting points 26a formed in second end 30 for selectively receiving key 42e. A bi-directional release latch 50 is also mounted on second end 30. Movement of latch 50 in a first direction D1, releases panel 36, to provide interior access to chassis 26, FIG. 3. Movement of latch 50 in a second direction D2 will be discussed later. In addition, again in FIG. 2, a receiver 52 is mounted in second end 30 for receiving the Kensington lock 46.

The security cover 44, FIG. 2, includes multiple feet 44a for engagement with respective slots 33 formed in second end 30. Cover 44 may be a molded synthetic one-piece member but is preferably a two-piece member including a first piece 44b and a second piece 44c separated by a seam 44e. The advantage of the two-piece member is that the two piece member allows the user to assemble all necessary cables, then enclose the cables with the two piece member. This order of assembly is an advantage over a single piece member. The Kensington lock 46 extends through an opening 44f in cover 44 and engages with the receiver 52 in second end 30.

Figure 4:
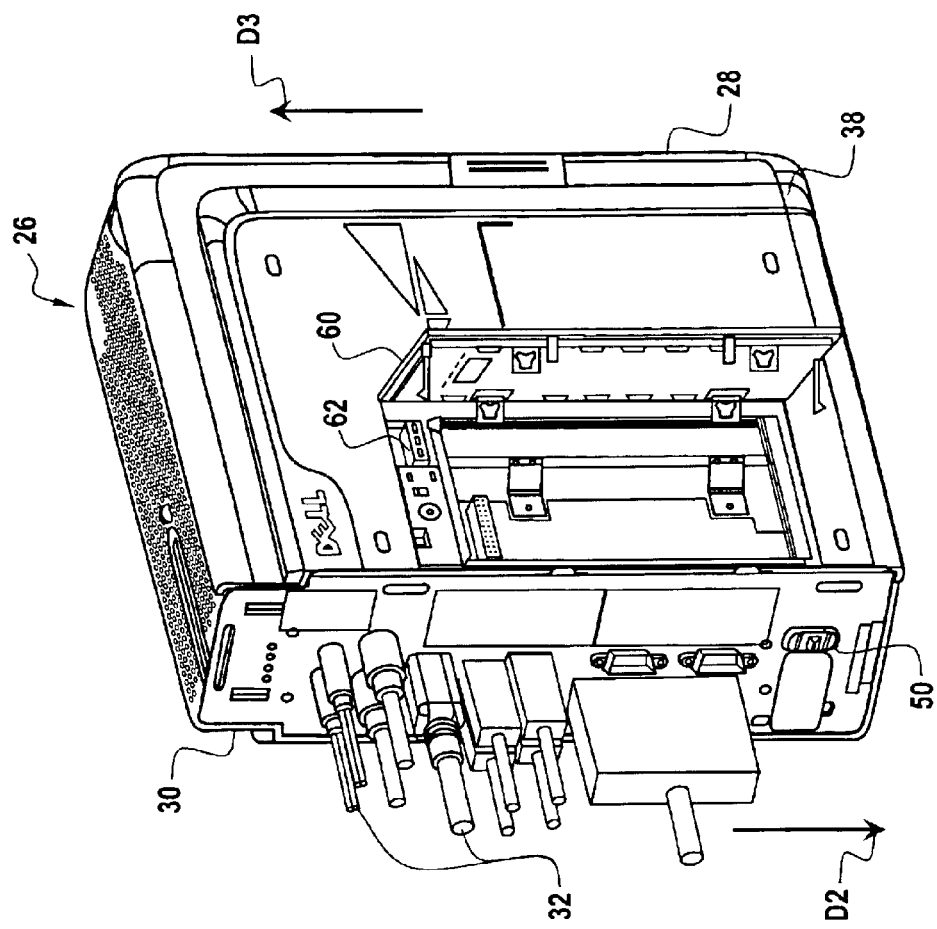
Figure 5:
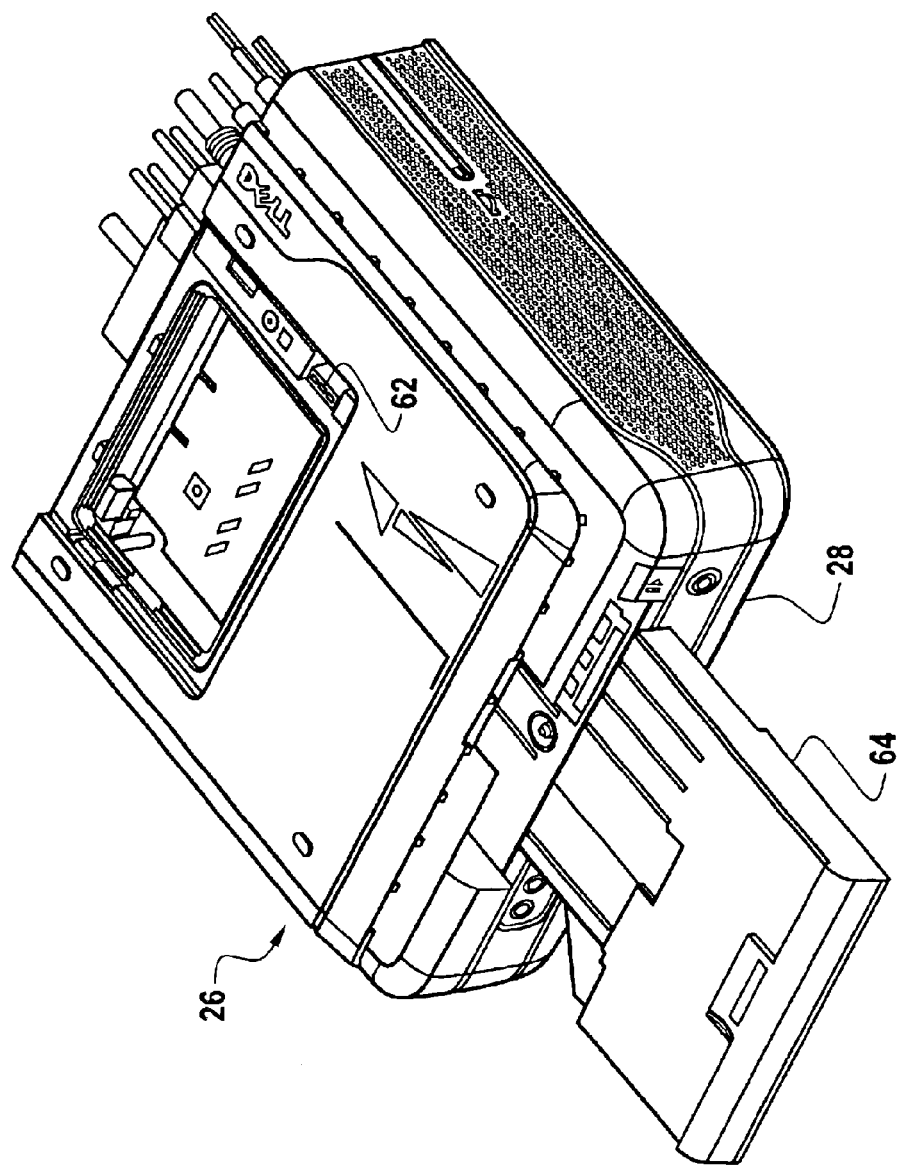

The second side 38, FIG. 4, illustrates another view of chassis 26 including a pivotable panel 60 for interior access to chassis 26. Panel 60 is released to open upon actuation of latch 50 in the second direction D2. Opening panel 60 exposes another release latch 62 which, upon movement in a direction D3, releases a door 64, which extends from first end 28 of chassis 26, FIG. 5, for containing a media storage device such as a floppy or a CD.

Figure 6:
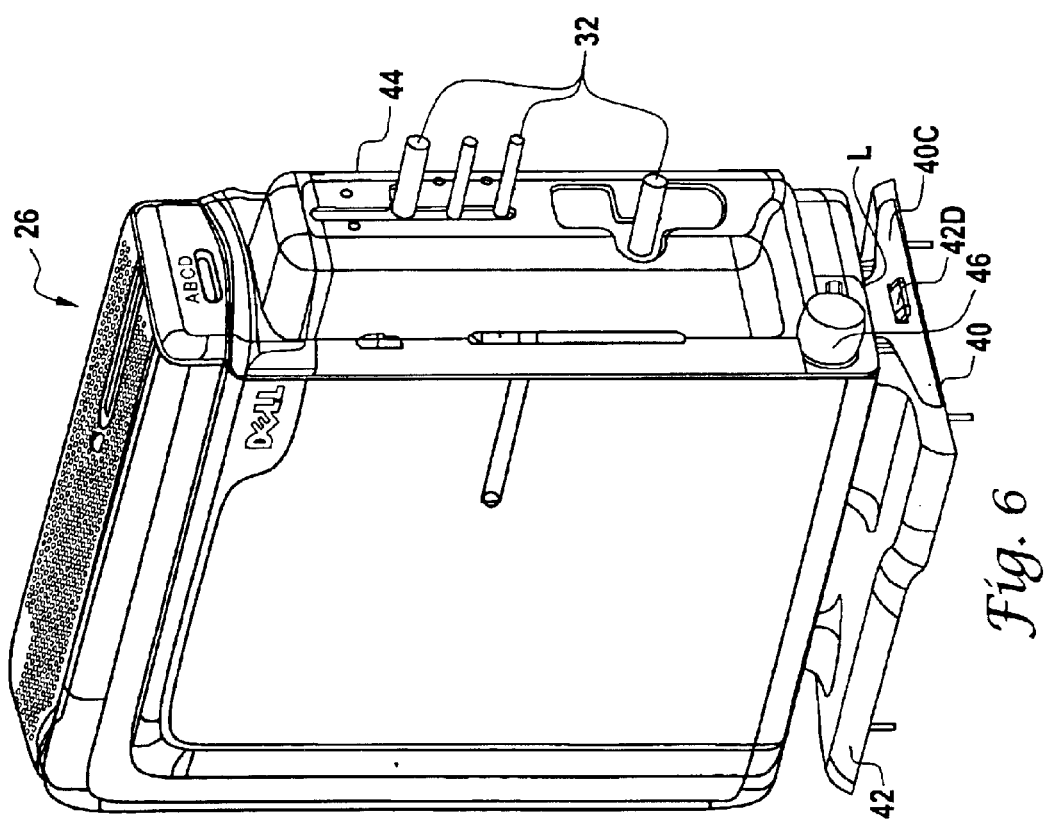
FIG. 6 is an assembled view illustrating an embodiment of the chassis security system.

In operation, reference being made to FIG. 2, bracket 40 is secured to a support surface (not shown) by means of fasteners 40f. Mounting member 42 is mounted on chassis 26 by sliding key 42e into a selected one of the mounting points 26a of chassis 26. The fastener 42f is fastened to a fastener receiver R formed adjacent each mounting point 26a. Chassis 26 is additionally supported due to contact with foot 42g. The mounting member 42 is mounted on bracket 40 by sliding engagement of tabs 40b in guides 42b, so that snap tab 42d extends through and snaps into engagement with slot 40e. Cover 44 is mounted on chassis 26 by inserting feet 44a in slots 33. Kensington lock 46 is inserted through opening 44f and secured in receiver 52. A bottom lip L of cover 44 extends over flange 40c of bracket 40 so that bracket 40 cannot move relative to mounting member 42, see FIG. 6. Cover 44 also covers all of the cable connections 32 connected to chassis 26 and also covers release latch 50.

Removal of cover 44 is permitted by first removing Kensington lock 46. This provides access to cable connections 32 and release latch 50. Flexure of snap tab 42d frees bracket 40 for relative movement with and separation from mounting member 42. Mounting member 42 can be removed from chassis 26 by release of fastener 42f.

Advantageously, a single lock securing the cover on the chassis, provides a lock for system components, system to environment and system cables.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computer comprising:
   a support surface bracket;
   a mounting member movably mounted on the bracket;
   a computer chassis releasably mounted on the mounting member; and
   a security cover member attached to an end of the chassis, the cover member being in locked engagement with the chassis and restricting movement of the mounting member on the bracket.

2. The computer as defined in claim 1 wherein the bracket is provided to be fastened to a support surface.

3. The computer as defined in claim 2 wherein the mounting member includes tabs for slidably engaging the mounting member.

4. The computer as defined in claim 3 wherein the mounting member includes guides for slidably receiving the tabs.

5. The computer as defined in claim 1 wherein the mounting member includes a plurality of attachment members connected to the chassis.

6. The computer as defined in claim 5 wherein the mounting member includes a flexible quick-release member for attachment to the bracket.

7. The computer as defined in claim 1 wherein the chassis includes a plurality of mounting points for receiving the mounting member.

8. The computer as defined in claim 1 wherein the cover member attaches to a cable end of the chassis and covers all cable connectors connected to the chassis.

9. The computer as defined in claim 1 wherein the cover member also covers a bi-directional release latch operable to release a first chassis panel and a second chassis panel.

10. The computer as defined in claim 9 wherein one of the chassis panels covers a storage member release latch.

11. An information handling system comprising:
    a chassis;
    a microprocessor mounted in the chassis;
    a storage coupled to the microprocessor;
    a support surface bracket;
    a mounting member movably mounted on the bracket;
    the chassis releasably mounted on the mounting member; and
    a security cover member attached to an end of the chassis, the cover member being in locked engagement with the chassis and restricting movement of the mounting member on the bracket.

12. The system as defined in claim 11 wherein the bracket is provided to be fastened to a support surface.

13. The system as defined in claim 12 wherein the bracket includes tabs for slidably engaging the mounting member.

14. The system as defined in claim 13 wherein the mounting member includes guides for slidably receiving the tabs.

15. The system as defined in claim 11 wherein the mounting member includes a plurality of attachment members connected to the chassis.

16. The system as defined in claim 15 wherein the mounting member includes a flexible quick-release member for attachment to the bracket.

17. The system as defined in claim 11 wherein the chassis includes a plurality of mounting points for receiving the mounting member.

18. The system as defined in claim 11 wherein the cover member attaches to a cable end of the chassis and covers all cable connectors connected to the chassis.

19. The system as defined in claim 11 wherein the cover member also covers a bi-directional release latch operable to release a first chassis panel and a second chassis panel.

20. The system as defined in claim 19 wherein one of the chassis panels covers a storage member release latch.

21. A method of securing an information handling system comprising:

attaching a bracket to a support surface;

releasably attaching a mounting member on a computer chassis;

movably mounting the mounting member on the bracket;

attaching a security cover on the computer chassis for restricting movement of the mounting member on the bracket; and locking the security cover onto the computer chassis.

22. An information handling system comprising:

a chassis;

a microprocessor mounted in the chassis;

a support bracket;

a mounting member movably mounted on the bracket;

the chassis releasably mounted on the mounting member; and a cover member attached to the chassis and locking the mounting member onto the chassis and locking the bracket onto the mounting member.

23. A computer comprising:

a support bracket;

a mounting member movably mounted on the bracket;

a computer chassis releasably mounted on the mounting member; and a cover member attached to the chassis and locking the mounting member onto the chassis and locking the bracket onto the mounting member.

* * * * *